United States Patent [19]
Church et al.

[11] Patent Number: 5,850,561
[45] Date of Patent: Dec. 15, 1998

[54] GLOSSARY CONSTRUCTION TOOL

[75] Inventors: Kenneth Ward Church, Chatham, N.J.; Ido Dagan, Haifa, Israel

[73] Assignee: Lucent Technologies Inc., Murray Hill, N.J.

[21] Appl. No.: 312,243

[22] Filed: Sep. 23, 1994

[51] Int. Cl.$^6$ .................................................... G06F 9/00
[52] U.S. Cl. ........................................................... 395/794
[58] Field of Search ......................... 364/419.11, 419.12, 364/419.13, 419.14; 395/794

[56] References Cited

U.S. PATENT DOCUMENTS

| | | | |
|---|---|---|---|
| 5,146,405 | 9/1992 | Church | 364/419 |
| 5,551,049 | 8/1996 | Kaplan et al. | 395/794 |

OTHER PUBLICATIONS

Brown, P.F., et al., "The Mathematics of Statistical Machine Translation: Parameter Estimation," Computational Linguistics, vol. 19, No. 2, 1993, pp. 261–311.

Church, K.W., "A Stochastic Parts Program and Noun Phrase Parser for Unrestricted Text," Proc. of the 2nd Conf. on Applied Natural Language Processing, Feb. 1988, pp. 136–143.

Church, K.W., "Char_align: A Program for Aligning Parallel Texts at the Character Level," Proc. of the 31st Annual Meeting of the Association for Computational Linguistics, Jun. 1993, pp. 1–8.

Church K.W. et al., "Aligning Parallel Texts: Do Methods Developed for English–French Generalize to Asian Languages?", Proc. of the First Pacific Asia Conf. on Formal & Computational Linguistics, Aug. 10, 1993, pp. 1–12.

Dagan, I., et al., "Robust Bilingual Word Alignment for Machine Aided Translation," Proc. of the Workshop on Very Large Corpora, Columbus, Ohio, 1993, 8 pages.

"Eurolang Optimizer," Commercial Brochure, 1994.

Justeson, J.S., Katz, M.S., "Technical Terminology: Some Linguistic Properties and an Algorithm for Identification in Text," Research Report, RC 18906 (82591), Computational Linguistics, May 18, 1993, 13 pages.

Smadja, F., "How to Compile a Bilingual Collocational Lexicon Automatically," AAAI–92 Workshop on Statistically Based NLP Techniques, Jul. 1992.

van der Eijk, P., "Automating the Acquisition of Bilingual Terminology," Proc. of the Sixth Conf. of the European Chapter of the Assoc. for Computational Linguistics, Apr. 21–23, 1993, pp. 113–119.

*Primary Examiner*—Phu K. Nguyen

[57] ABSTRACT

A glossary construction tool for generating and maintaining a translation glossary, consisting of a number of terms and their translations. The glossary construction tool includes a terminology list development tool for generating a terminology list in the source language and a glossary development tool for automatically obtaining candidate translations for the terms in the terminology list. The terminology list development tool will construct the terminology list in the source language by analyzing the source text document to be translated and automatically extracting a list of candidate terms, comprised of multiple word noun phrases and single words not appearing on a standard or predefined stop list of "noise" words. The glossary development tool will obtain candidate translations for terms in the final terminology list by searching the source text document of a word-aligned text pair for a term to be translated and then provide candidate translations based on the indicated alignment with the target text document of the aligned text pair. A concordance tool provides monolingual and bilingual concordances in order to facilitate the user's evaluation of the automatically generated list of candidate terms and candidate translations, respectively.

38 Claims, 9 Drawing Sheets

SOURCE: YOU CAN TYPE APPLICATION PARAMETERS IN THE OPTIONAL PARAMETERS BOX.

TARGET: VOUS POUVEZ TAPEZ LES PARAMETRES D'UNE APPLICATION DANS LA ZONE PARAMETRES OPTIONNELS.

FIG. 2A

WORD ALIGNMENT DATA STRUCTURE

| SOURCE TEXT WORD | SOURCE TEXT WORD POSITION | ESTIMATED TARGET TEXT WORD POSITION |
|---|---|---|
| YOU | 1 | 1 |
| CAN | 2 | 2 |
| TYPE | 3 | 3 |
| APPLICATION | 4 | 7 |
| PARAMETERS | 5 | NA |
| IN | 6 | NA |
| THE | 7 | NA |
| OPTIONAL | 8 | 12 |
| PARAMETERS | 9 | 12 |
| BOX | 10 | 10 |

FIG. 2B

GLOSSARY CONSTRUCTION TOOL

FIELD OF THE INVENTION

The present invention relates to a method and apparatus for facilitating the translation of a source language document into a target language, and more particularly, to a method and apparatus for generating and maintaining a translation glossary, consisting of a list of terms and their translations.

BACKGROUND OF THE INVENTION

The translation of technical materials from a source language into a target language has historically been a very labor intensive task. In addition, the translation of technical documents is frequently performed under severe time pressure, with customers desiring to distribute a product and its documentation throughout the world at the same time. Accordingly, the translation of a single document is often divided among a number of translators in order to meet customer deadlines.

Thus, in order to ensure consistency and accuracy in the translation of a single document, as well as consistency and accuracy in the translation of a number of documents translated for the same customer or domain, it is important to standardize on a single translation for each technical term. Accordingly, the construction of customer or domain specific translation glossaries, consisting of key technical terms and their translations, is a significant step in the technical translation process.

Typically, a translator would construct a translation glossary by reading as much background material in the particular technical area as possible in both the source and target languages. The translator will often refer to technical reference manuals, such as technical dictionaries, and documents previously translated for the same customer or domain. However, the technical dictionaries and other references are often out of date, and do not typically contain a highly specialized technical vocabulary. Furthermore, even when a technical dictionary does contain an entry for a desired technical term, the dictionary will generally offer a number of alternative translations for the same term without providing significant guidance as to how to select one of the various alternatives for a particular usage.

The manual development of a translation glossary in this manner involves high labor costs, as well as a significant risk that the translator will miss important terms. Thus, in order to minimize the time required to develop a translation glossary, as well as the likelihood that important technical terms will be missed, it has been recognized that parallel texts could be utilized to automate portions of the glossary development task and to help translators overcome their lack of domain expertise. Parallel texts consist of one or more previously translated source text documents aligned with the translation of the document in the target language. Thus, parallel texts allow a translator to search the previously translated documents for potentially difficult terminology in order to determine how the terminology was translated in the past.

A number of semi-automated glossary construction tools have been developed or proposed for facilitating the translation process using parallel texts. For example, a number of researchers have proposed finding candidate translations from parallel texts aligned at the sentence level by allowing a user to search for a desired term in the aligned parallel texts. For a discussion of proposed techniques for generating translation glossaries using parallel texts aligned at the sentence level, see, for example, William Ogden and Margarita Gonzales, "Norm—A System for Translators," Presentation, ARPA Workshop on Human Language Technology, p. 223 (Mar. 21–24, 1993); and Frank Smadja, "How to Compile a Bilingual Collocational Lexicon Automatically," AAAI Workshop on Statistically-Based Natural Language Processing Techniques, (July, 1992).

In addition, the Translators' Workbench™, a software product commercially available from MCB Systems, San Diego, Calif., includes a terminology data base and utilizes a text analysis program to generate a project dictionary of the words in a source text document which appear in the terminology data base. The Translators' Workbench™ also includes a translation editor which highlights each of the words in the source text document which appears in the project dictionary. When the cursor is moved to a highlighted word, the translation from the terminology data base may be copied into the translation document being developed.

Similarly, the Eurolang Optimizer™, a product commercially available from Eurolang, Maisons Alfort, France, maintains a translation memory of previously translated materials. The Eurolang system will analyze a source text document to be translated and identify previously translated sentences and technical terms appearing in the translation memory.

While the Translators' Workbench™ and Eurolang Optimizer™ provide an effective basis for automating portions of the translation process, these systems have concentrated more on the utilization of translation glossaries and less on their development. Although these systems may provide a graphical user interface (GUI) which allows a user to manually enter translation glossaries, they do not attempt to automatically generate a terminology list of the technical terms in the source language by analyzing the source text document to be translated. Furthermore, these systems do not provide a mechanism for reliably generating candidate translations for terms in the source language terminology list using alignment of parallel texts at the word level.

As is apparent from the above discussion, a need exists for a glossary construction tool that is capable of generating a terminology list consisting of the technical terms in a source text document to be translated. A further need exists for a glossary construction tool capable of obtaining candidate translations for terms in the terminology list using word level alignment of previously translated parallel texts. In addition, a need exists for a semi-automated glossary construction tool that provides interactive user interfaces in a single environment that support and facilitate the task of generating translation glossaries and translating technical documents.

SUMMARY OF THE INVENTION

Generally, according to one aspect of the invention, a glossary construction tool is provided for generating and maintaining a translation glossary, consisting of a number of terms and their translations. The glossary construction tool includes a terminology list development tool for generating a terminology list in the source language, as well as a glossary development tool for generating the translation glossary by automatically obtaining candidate translations for source language terms listed in the generated terminology list.

The terminology list development tool will construct the terminology list in the source language by analyzing the source text document to be translated and automatically extracting a list of candidate terms. Since technical terminology is largely comprised of multiple word noun phrases, the list of candidate terms is automatically generated by extracting the multiple word noun phrases from the source text document to be translated. The source text document is preferably preprocessed by a part-of-speech tagger which will annotate each word in the source document with the appropriate part of speech, thereby allowing automatic detection of the multiple word noun phrases.

In addition to the extraction of multiple word noun phrases, the generated terminology list preferably includes single words extracted from the document that do not appear on a standard or predefined stop list of "noise" words. By including single words in the candidate terminology list, the user can thereby identify multiple word noun phrases that do not appear in the candidate list due to improper tagging by the part-of-speech tagger.

The terminology list development tool will preferably sort the terms in the candidate terminology list for efficient presentation to the user. The extracted candidate terms are preferably sorted so that linguistically related terms appear near one another. In one embodiment, all candidate terms having the same head word, or final noun, are grouped together. Within each head word group, candidate terms are preferably sorted according to their rhyming order, from the more specific to the more general modification of the head word. Thereafter, the head word groups are preferably listed by decreasing frequency of the head word in the source text document to be translated.

The glossary development tool will obtain candidate translations for terms in the final terminology list by utilizing an aligned text pair, consisting of at least one pair of documents which are translations of one another and which have been aligned by a text alignment tool. The glossary development tool will search the source text document of the aligned text pair for a term to be translated and then provide candidate translations based on the indicated alignment with the target text document of the aligned text pair. Preferably, the text alignment tool aligns the pair of previously translated documents using word level alignment to provide a mapping of the words of the source language document with the words of the corresponding target language document in creating the aligned text pair.

In one embodiment, the glossary development tool will generate candidate translations for a selected source text term by searching the source text document of the aligned text pair for the term to be translated and extracting the sequence of words that spans between the first and last words in the target language document of the aligned pair that are aligned with any words of the selected source term.

A concordance tool is provided to make full or partial context concordances from a source text document to be translated or a pair of aligned texts. When the concordance tool is utilized by the terminology list development tool, a monolingual concordance will show all occurrences of a selected candidate term in context in the source text document to be translated. Thus, a user can review the monolingual concordance lines for a selected candidate term and determine whether each term should appear in a final terminology list.

The monolingual concordance lines are preferably sorted such that all occurrences of identical preceding contexts of a selected candidate term are grouped together. Thus, a technical term that is missing from the candidate terminology list, perhaps due to an error by the part-of-speech tagger, can be identified and added to the generated terminology list.

When the concordance tool is utilized by the glossary development tool, a bilingual concordance will show all occurrences of a candidate translation in context in the source text document of the aligned text pair and the corresponding positions in the target text of the aligned text pair. Thus, a user can review and evaluate the bilingual concordance lines for a selected candidate translation and identify the appropriate translation for the current source term.

A more complete understanding of the present invention, as well as further features and advantages of the invention, will be obtained by reference to the detailed description and drawings.

BRIEF DESCRIPTION OF THE DRAWINGS

FIG. 2 is a graphical illustration of the word level mapping performed by the text alignment tool of FIG. 1B for a sentence in a source language and the corresponding words of the translated sentence in a target language;

FIG. 2 illustrates a word alignment data structure for maintaining the alignment information associated with the aligned text pair of FIG. 2A;

DETAILED DESCRIPTION

Figure 1A:
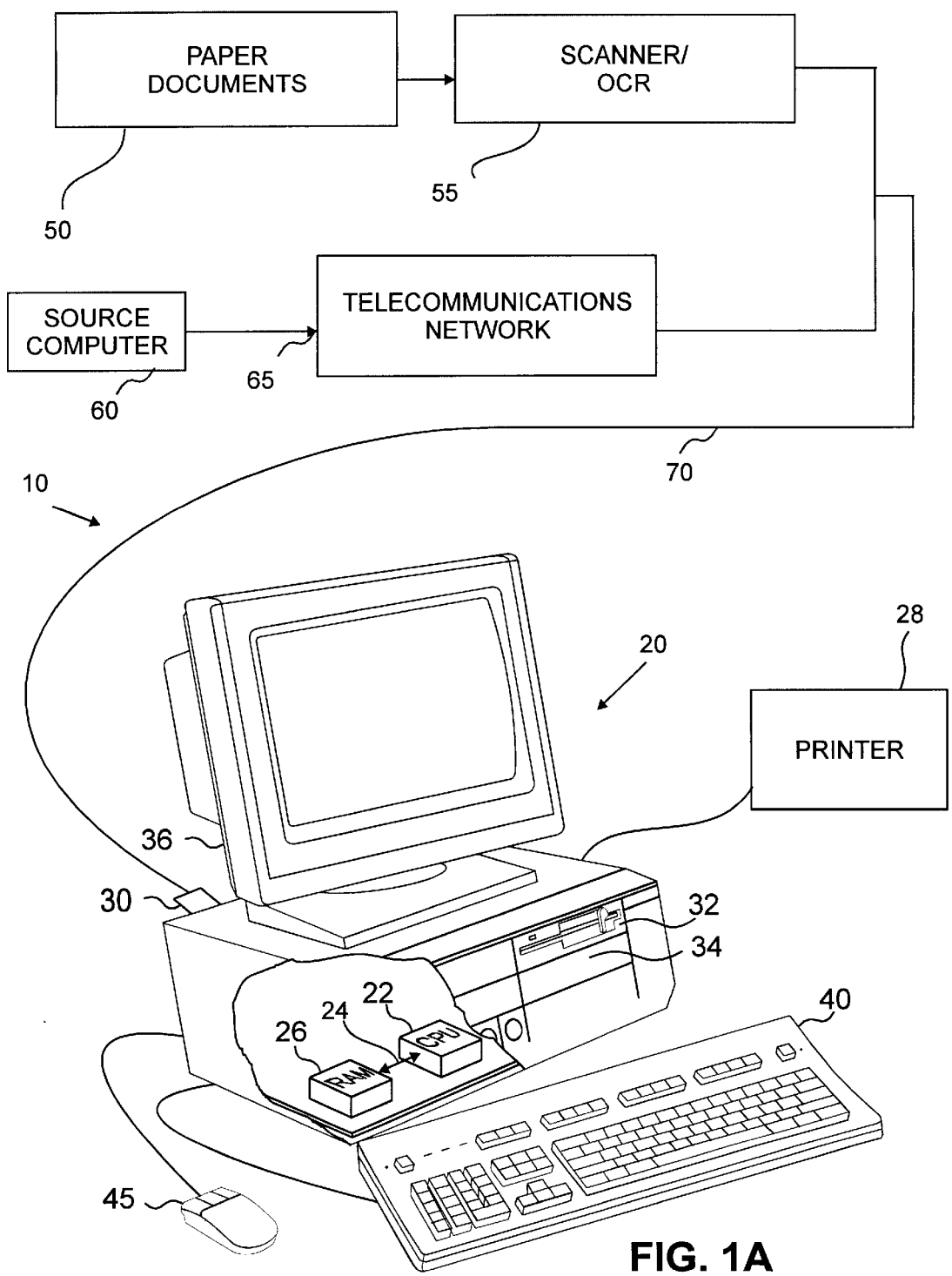
FIG. 1 is a functional block diagram illustrating a glossary construction tool according to the present invention.
FIG. 1B is a functional block diagram illustrating the processing and memory storage systems of the glossary construction tool of FIG. 1A.

A glossary construction tool 10 according to the present invention is shown in FIG. 1A. As discussed further below, the glossary construction tool 10 provides a number of tools for generating and maintaining a translation glossary, consisting of a number of terms and their translations, in order to facilitate the task of translating a source language document into a target language. As discussed further below, the presently preferred glossary construction tool 10 contains at least two tools for developing the translation glossary, namely, a terminology list development tool 160 for generating a terminology list in the source language and a glossary development tool 170 for generating the translation glossary by automatically obtaining candidate translations for terms listed in the generated terminology list.

The present invention may be implemented using a general purpose computing system 20, such as the computing system 20 illustrated in FIG. 1A, which may be embodied as a mainframe computer, a minicomputer, a workstation, a personal computer or a networked combination of any of the foregoing. The general purpose computing system 20 preferably includes a graphical display monitor 36, one or more processing units 22, a memory storage device 26, such as a random access memory, busses 24, a printer 28 and one or more user interfaces, such as a mouse 45 and a keyboard 40. The processing unit 22 and memory storage device 26 are discussed further below, in conjunction with FIG. 1B.

The computing system 20 preferably also includes an external disk drive 32 and a hard disk drive 34. The external disk drive 32 is operable to receive, read and write to one or more external data storage devices, such as a floppy disk, tape, or compact disk, while the hard disk drive 34 is operable to provide fast access data storage and retrieval functions, in a known manner.

Figure 6:
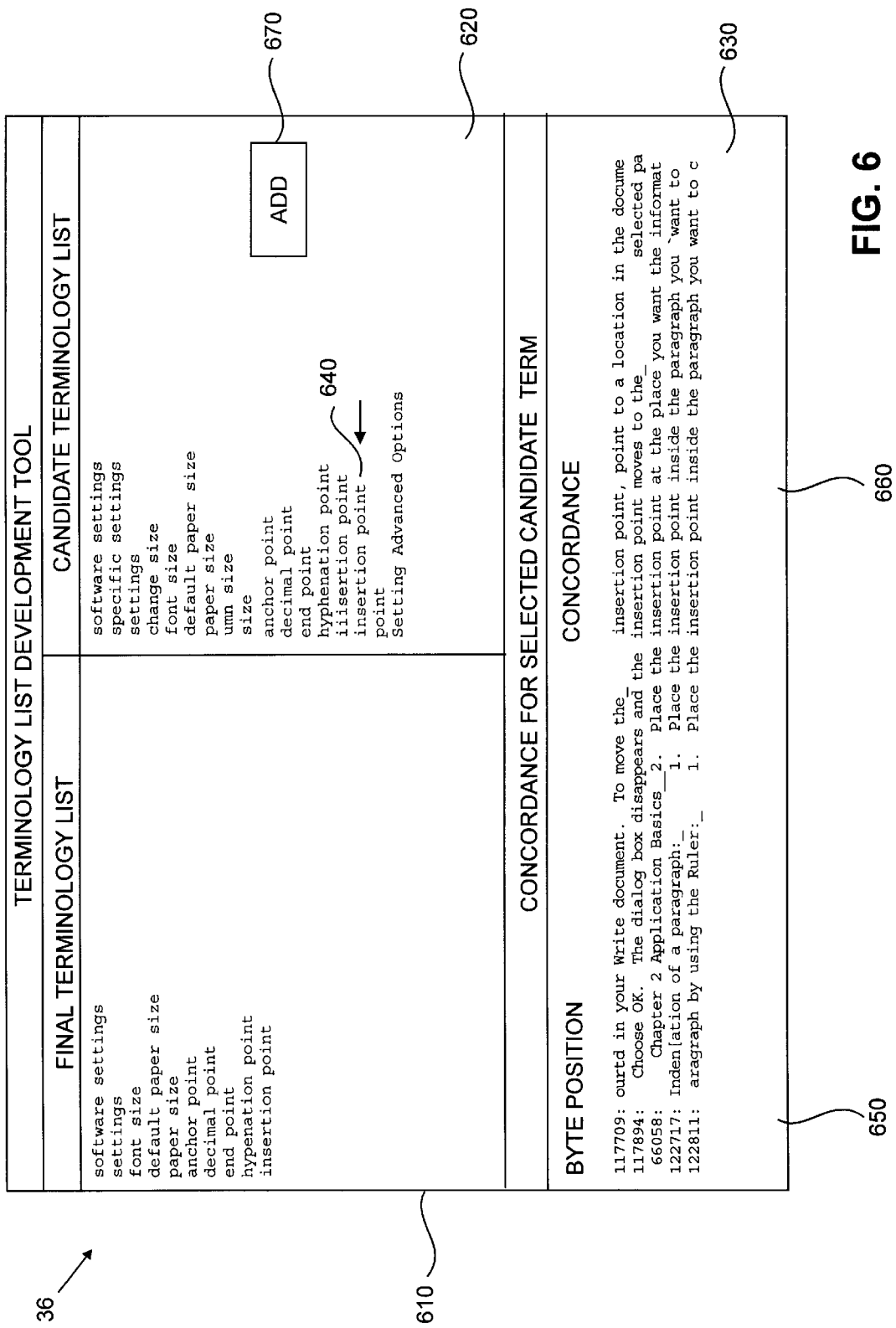
FIG. 6 illustrates a display monitor suitable for use in conjunction with the terminology list development tool of FIG. 1B, having a plurality of windows for the simultaneous display of a candidate terminology list, together with monolingual concordances showing each occurrence of a selected candidate term.
Figure 9:
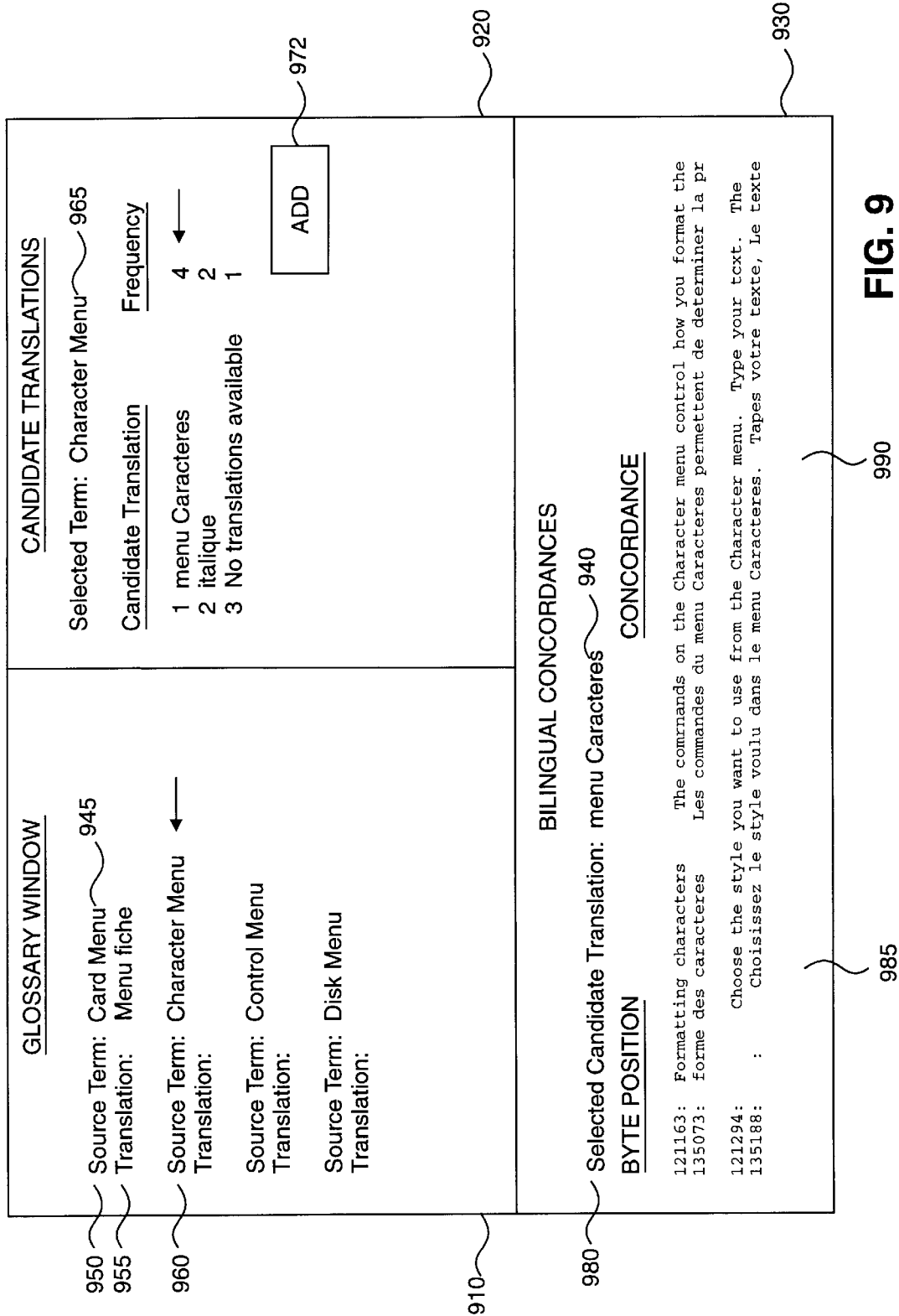
FIG. 9 illustrates a display monitor suitable for use in conjunction with the glossary development tool of FIG. 1B, having a plurality of windows for the simultaneous display of a translation glossary being developed, together with candidate translations for a selected source text term and the bilingual concordances showing each occurrence of a selected candidate translation.

The mouse 45 or another graphical input device, such as a joystick, tracker ball, or light pen, together with the display system described below in conjunction with FIGS. 6 and 9, provide a mechanism for user interaction with the computing system 20. Preferably, the general purpose computing system 20 is running under a graphical user interface (GUI), such as Microsoft Windows for MS-DOS computers or Presentation Manager, developed by Microsoft and IBM, for computers utilizing an OS/2 operating system. However, the techniques disclosed herein may be implemented using any operating system. The alphanumeric keyboard 40 provides the usual functions and additionally serves as an alternative data entry means.

In addition, the computing system 20 preferably includes one or more data communication ports 30 for serial or parallel data communication with remote devices. In one embodiment, the textual portions of a paper document 50 are preferably converted into a computer-readable format by a scanner and optical character recognition system 55, in a known manner, for transfer to the computing system 20 via data link 70. Similarly, a copy of each source text document received directly in electronic computer-readable form, for example, from a source computer 60 over a telecommunications network 65, may be transferred to the computing system 20, via data link 70.

In this manner, the glossary construction tool 10 may be interconnected with other glossary construction tools 10, for example being utilized by supervisory personnel or other translators working on the same task, or with a central document storage device which stores documents to be translated, via a telecommunications network 65, such as a local area network (LAN) or alternatively, by means of a modem and a telephone line (not shown). In addition, documents or instructions can be distributed among personnel by means of a media transfer such as a floppy disk sent physically from one location to another.

Figure 1B:
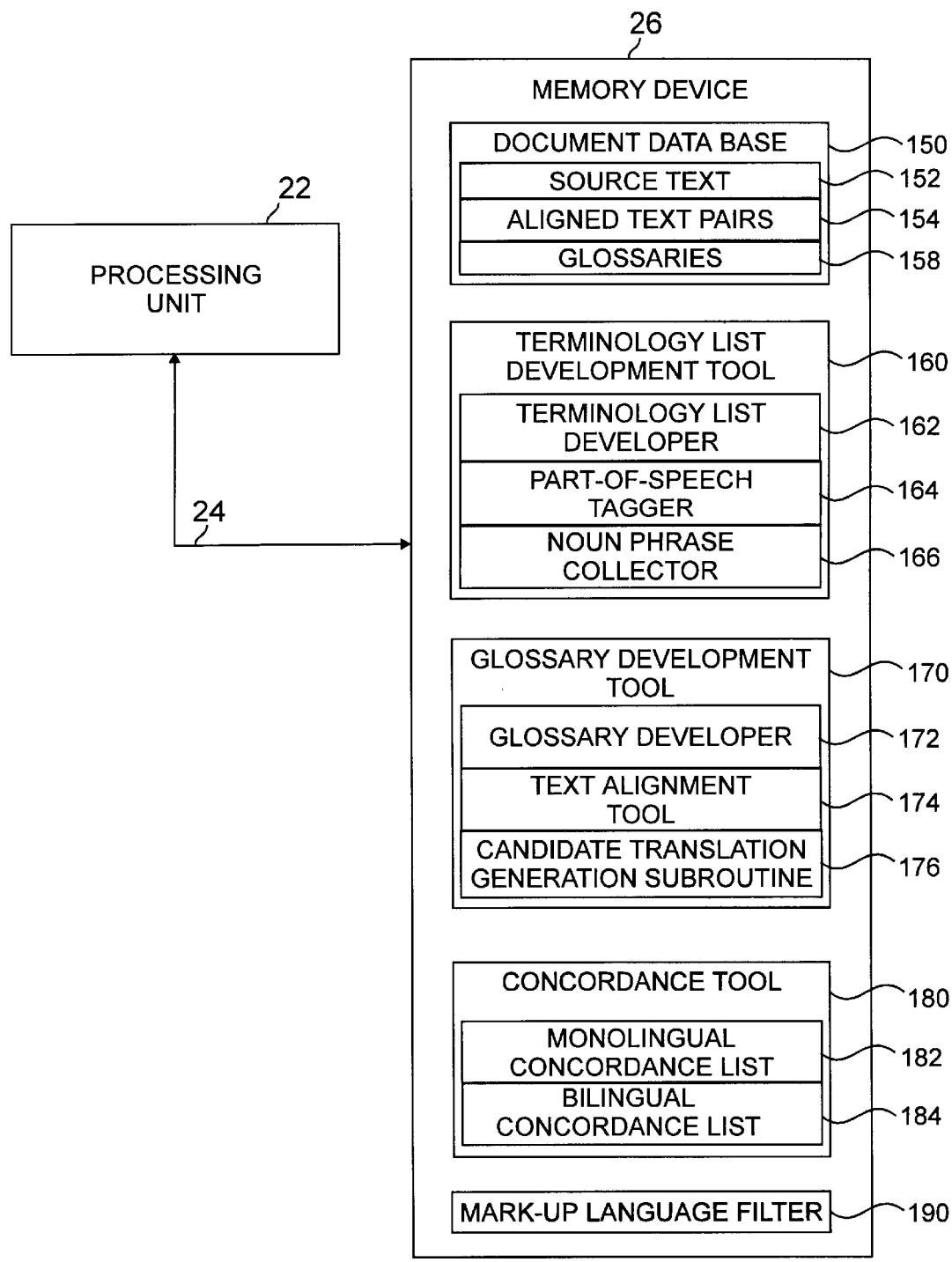

As shown in FIG. 1B, the processing unit 22, which may be embodied as a single processor or a number of processors operating in parallel, is preferably configured to implement the program code and translation tools, discussed below, associated with the present invention which may be stored in the memory device 26. It is noted that although the program code, documents and translation tools are illustrated as being stored in the memory device 26, they may alternatively be stored in one or more remote memory devices, as would be apparent to one skilled in the art.

The glossary construction tool 10 includes a document data base 150 for storing one or more source text documents 152, which are the documents to be translated into the target language using the glossary construction tool 10. As previously indicated, source text documents 152 may be received for translation from a customer in the form of a paper document 50 or as a computer-readable electronic file, for example, from a source computer 60. It is noted that source text documents 152 received by the glossary construction tool 10 in an electronic format may have to be processed by a mark-up language filter 190, which will process files produced using standard text editing programs, in a known manner, to facilitate further processing.

In addition, the document data base 150 also includes aligned text pairs 154 and one or more translation glossaries 158, consisting of a number of terms and their translations, which facilitate the translation process. As is well known, an aligned text pair 154 is a pair of documents which are translations of one another and which have been aligned by a text alignment tool 174, discussed below. A pair of translated documents are aligned by associating information with the pair of files such that if a first location in one document of the pair is identified, a second location may be automatically found in the second document which contains a translation of the first location.

In addition, the glossary construction tool 10 includes a terminology list development tool 160 which is preferably utilized to construct the terminology list in the source language by analyzing the source text 152 to be translated and automatically extracting a list of candidate terms. The terminology list development tool 160 preferably includes a terminology list developer 162, a part-of-speech tagger 164 and a noun phrase collector 166, discussed further below in conjunction with FIGS. 3 through 5.

Since technical terminology is largely comprised of multiple word noun phrases, the list of candidate technical terms is automatically generated according to one feature of the present invention by extracting the multiple word noun phrases from the document to be translated. In addition, single words, not appearing on a standard or predefined stop list of "noise" words, are preferably extracted as well. The addition of single words to the candidate terminology list also serves to provide a mechanism for identifying multiple word noun phrases that failed to appear in the candidate list due to improper tagging by the part-of-speech tagger 164. Thereafter, the terminology list development tool 160 provides a user interface to evaluate the automatically generated list of candidate terms in order to develop a final terminology list.

As discussed further below, the part-of-speech tagger 164 will process a source text document 152 and annotate each word in the document 152 with the appropriate part of speech. For a discussion of a suitable part-of-speech tagger 164, see U.S. Pat. No. 5,146,405, to Kenneth W. Church, assigned to the assignee of the present invention, or Kenneth Ward Church, "A Stochastic Parts Program and Noun Phrase Parser for Unrestricted Text," Proc of the 2d Conf. on Applied Natural Language Processing, pp. 136–143, February, 1988, each incorporated herein by reference.

Generally, the difficulty with part of speech tagging is that many words have more than one part of speech. For example, the word "table" can be a verb in some contexts while being a noun in others. The part-of-speech tagger 164 preferably selects the appropriate part of speech for a given word by optimizing the product of the lexical probabilities and the contextual probabilities.

The lexical probability is defined as the probability of observing part of speech i, given word j. For example, the lexical probability that "table" is a verb is estimated as the frequency that the word "table" appears as a verb over the frequency of the word "table" appearing as any part of speech. The contextual probability is defined as the probability of observing a part of speech i, given k previous or subsequent parts of speech. For example, if in its current context the word "table" is followed by an article and a noun, the contextual probability that the word "table" is appearing as a verb in its current context is estimated as the probability of a verb appearing before an article and a noun.

It is noted that although the part-of-speech tagger 164 may not be completely accurate in annotating the words in the source text document 152 with the appropriate part of speech, a number of back up mechanisms, discussed below, are preferably provided in the terminology list development tool 160 to compensate for errors in the part-of-speech tagger 164.

As shown in FIG. 1B, the glossary construction tool 10 also includes a glossary development tool 170 which facilitates the generation of the translation glossary by obtaining candidate translations for terms in the final terminology list generated using the terminology list development tool 160. As discussed further below, the glossary development tool 170 will search the source text of the aligned text pair 154 for each term in the final terminology list and provide candidate translations based on the indicated alignment with the target text of the aligned text pair 154. The glossary development tool 170 preferably includes a glossary developer 172, a text alignment tool 174 and a candidate translation generation subroutine 176, discussed further below in conjunction with FIGS. 7 and 8.

As previously indicated, parallel texts can be utilized by translators to overcome their lack of domain expertise by providing the translators with the ability to search previously translated documents for examples of potentially difficult terminology to determine how the terminology was translated in the past. Thus, according to one feature of the present invention, candidate translations are obtained for terms in the terminology list by searching the source text of the aligned text pair 154 for a term to be translated and then automatically generating candidate translations based on the indicated alignment with the target text of the aligned text pair 154.

As discussed further below, the accuracy of the generated candidate translations depends in large part on the accuracy of the text alignment tool 174 in determining which parts of the source text correspond with which parts of the target text in the aligned text pairs 154. Accordingly, a word level or word-by-word text alignment tool is preferably utilized. For a discussion of a suitable word level text alignment tool, see Ido Dagan et al., "Robust Bilingual Word Alignment for Machine Aided Translation," Proc. of the Workshop on Very Large Corpora: Academic and Industrial Perspectives, pp. 1–8 (Columbus, Ohio 1993); Kenneth Church et al., "Aligning Parallel Texts: Do Methods Developed for English-French Generalize to Asian Languages?", Proc. of the 1st Pacific Asia Conf. on Formal and Computational Linguistics, pp. 1–12, Aug. 10, 1993; or Peter Brown et al., "The Mathematics of Machine Translation: Parameter Estimation," Computational Linguistics, Vol. 19, No. 2, pp. 263–311 (1993), each incorporated herein by reference.

Generally, the word alignment tool 174 initially performs a rough alignment using a well known character alignment tool, which is based on the cognate method and assumes that a number of words in the source language will have the same or a similar position in the corresponding target language. For a discussion of a suitable character alignment tool, see U.S. patent application Ser. No. 07/944,148, filed Sep. 11, 1992, entitled "TRANSLATOR'S ASSISTANT", assigned to the assignee of the present invention; and Kenneth Ward Church, "Charalign: A Program for Aligning Parallel Texts at the Character Level," Proc. of the 31st Annual Meeting of the Assn. for Computational Linguistics, pp. 1–8, June, 1993. Alternatively, the rough alignment can be performed using a well known sentence-based alignment method.

Thereafter, the word level alignment tool 174 will obtain an improved alignment over the rough alignment estimate by exploiting constraints at the word level. Preferably, the word alignment tool 174 will produce a partial mapping between the words of the source language document and the target language document in creating an aligned text pair 154, skipping words that cannot be aligned at a given confidence level. FIG. 2A illustrates the word alignment generated by the word level text alignment tool 174 for a sentence 210 in a source language and the corresponding words of the translated sentence 220 in the target language.

It is noted that the word level text alignment tool 174 may not be completely accurate in aligning the source and target texts 210, 220, as illustrated in FIG. 2A. For example, the alignment of the word "parameters" in the source language 210 to the word "optionnels" in the target language 220 is incorrect. However, a number of backup mechanisms, discussed below, are preferably provided in the glossary development tool 170 to compensate for errors in the word alignment.

The alignment between the source language text 210 and the target language text 220 is maintained by accessing a word alignment data structure 250 illustrated in FIG. 2B. The word alignment data structure 250 illustrated in FIG. 2B includes a source text word column 255, a source text word position column 260 and an estimated target text word position 265. However, the source text word column 255 is presented for illustrative purposes only, as would be apparent to one of ordinary skill in the art. The rows of the word alignment data structure 250, such as the rows 270, 272, 274 and 276, are each associated with a word in the source text document.

The entry in column 260 of the word alignment data structure 250 is an indication of the word position or byte position of each word in the source text document. The location of the translation of a given word in the target text document is provided in the corresponding entry in column 265 of the word alignment data structure 250. In this manner, a source text document may be aligned with its translation by retrieving the word or byte position from column 260 and the corresponding word or byte position in the translation from column 265.

In a preferred embodiment, the entry in column 265 remains blank for a given word if the word alignment tool 174 cannot align the source text word with the target text with a given confidence level, such as the entries in the word alignment data structure 250 associated with the word phrase "parameters in the".

As shown in FIG. 1B, the glossary construction tool 10 preferably also includes a concordance tool 180 to make a full or partial context concordance from a source text 152 or a pair of aligned texts 154, in a known manner. As discussed further below, when utilized in the terminology list development tool 160, a monolingual concordance will preferably show all occurrences of a selected term in context in the source text 152, by referring to a monolingual concordance list 182, discussed below. Similarly, when utilized in the glossary development tool 170, a bilingual concordance will preferably show all occurrences of a selected candidate translation in context in the source text of the aligned pair 154 and show the corresponding positions in the target text of the aligned pair 154, by referring to a bilingual concordance list 184, discussed below.

TERMINOLOGY LIST DEVELOPMENT TOOL

As previously indicated, the technical terms in a source text document 152 to be translated consist largely of multiple word noun phrases. Accordingly, the terminology list developer 162 will analyze the source text document 152 to be translated and extract multiple word noun phrases in order to generate the list of candidate terms. In a preferred embodiment of the present invention, single words not appearing on a stop list will be extracted as well, thereby providing a backup mechanism, discussed further below, to compensate for errors in the part-of-speech tagger 164.

Figure 3:
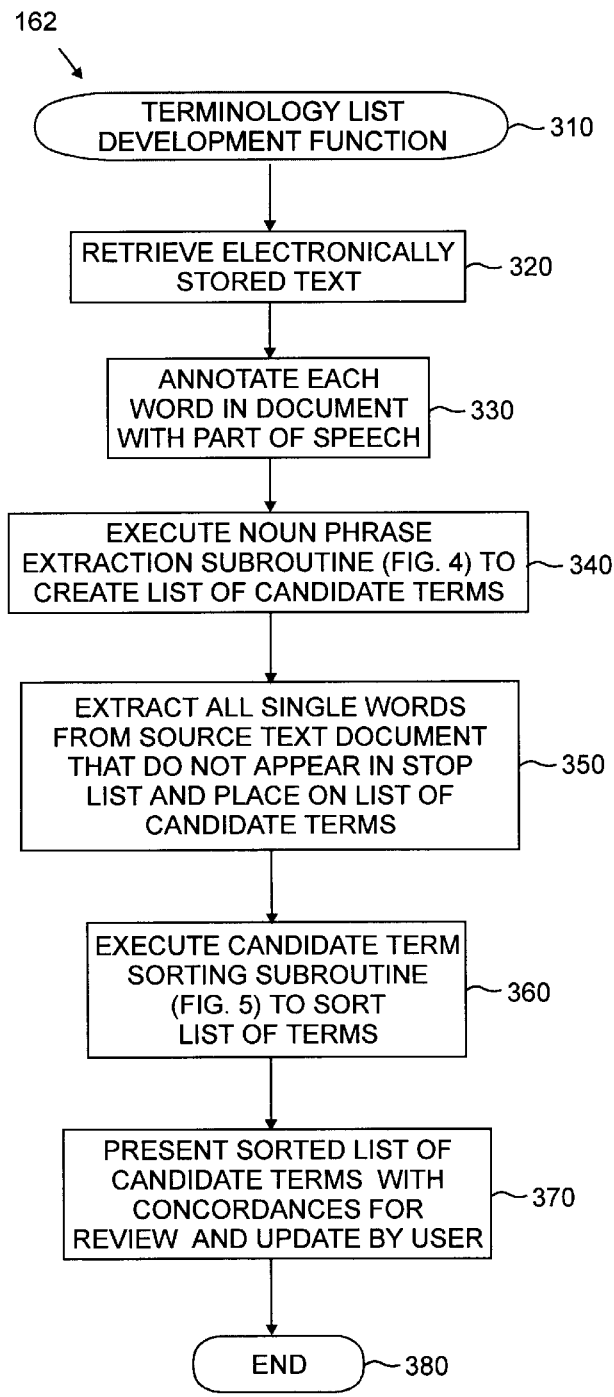
FIG. 3 is a flow diagram describing an exemplary terminology list developer for utilization in conjunction with the terminology list development tool of FIG. 1B.

The terminology list developer 162 embodying principles of the present invention will be entered at step 310, as shown in FIG. 3. The terminology list developer 162 will initially retrieve the computer-readable source text 152 to be translated during step 320. Thereafter, the source text 152 will be processed by the part-of-speech tagger 164 during step 330 in order to annotate each word in the source text document 152 with the appropriate part of speech.

Figure 4:
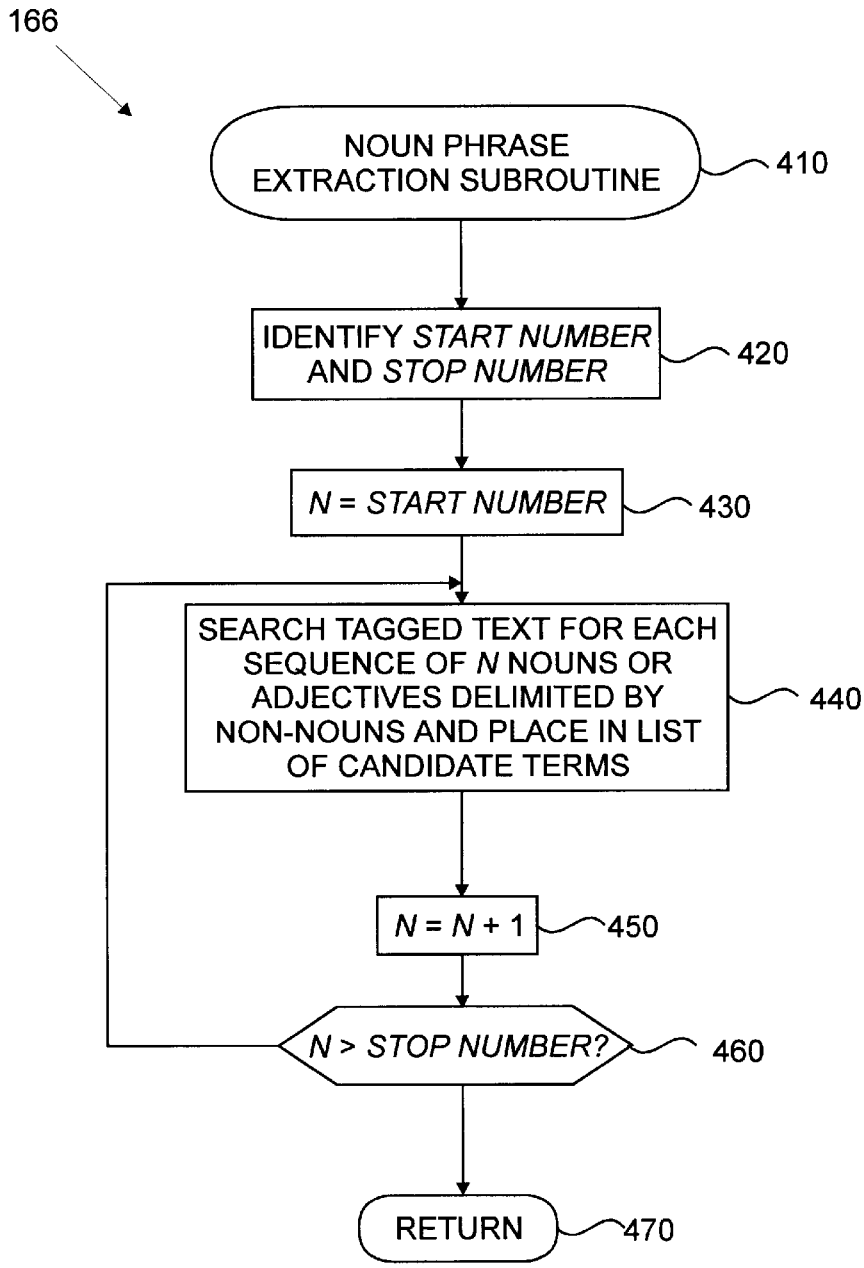
FIG. 4 is a flow diagram describing an exemplary noun phrase extraction subroutine, suitable for use in conjunction with the terminology list developer of FIG. 3.

The terminology list developer 162 will develop the candidate terminology list by identifying the noun phrases in the annotated source text document. In a preferred embodiment, a noun phrase extraction subroutine 166, discussed below in conjunction with FIG. 4, is executed during step 340 in order to extract the multiple word noun phrases from the tagged source text document 152. In one embodiment, a noun phrase is defined to be a multiple word phrase consisting of nouns, as well as adjectives, delimited by words that are not nouns or adjectives.

Thereafter, during step 350, the terminology list developer 162 will preferably extract all of the single words from the source text document 152 that do not appear in a standard or predefined stop list of "noise" words. In this manner, the list of candidate terms preferably contains both multiple word noun phrases and single words. By including single words in the candidate list, the user can thereby also identify multiple word noun phrases that do not appear in the candidate list due to improper tagging by the part-of-speech tagger 164.

Figure 5:
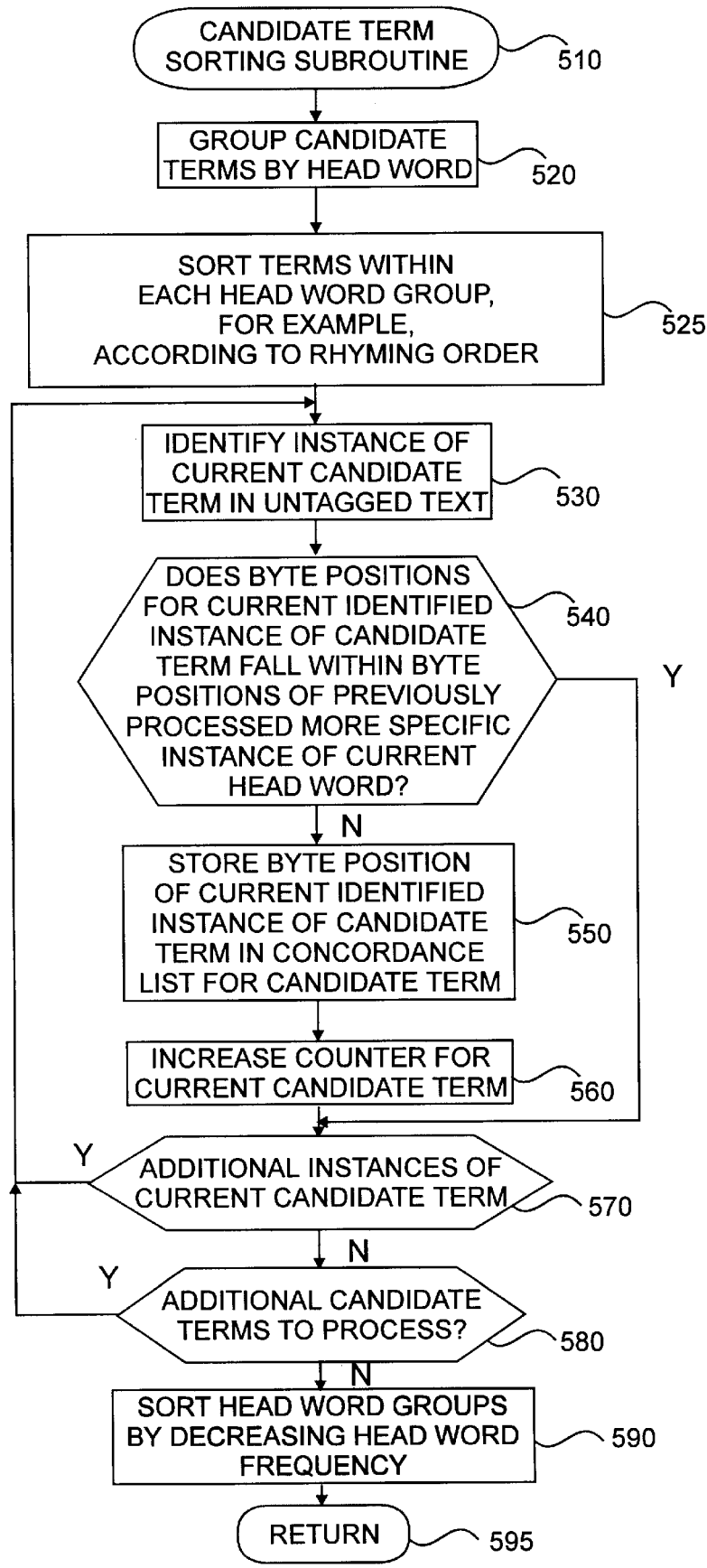
FIG. 5 is a flow diagram describing an exemplary candidate term sorting subroutine, suitable for use in conjunction with the terminology list developer of FIG. 3.

Thereafter, the terminology list developer 162 will preferably sort the terms in the candidate terminology list for efficient presentation to the user. In a preferred embodiment, a candidate term sorting subroutine, discussed below in conjunction with FIG. 5, is executed during step 360 in order to sort the extracted candidate terms prior to presenting the list to the user.

Preferably, the extracted candidate terms are sorted by the candidate term sorting subroutine (FIG. 5) so that the "better" terms are placed at the top of the list. In this manner, time is efficiently spent by evaluating the terms in the list in the order in which they appear, for as long as time limitations permit. In addition, it is preferred that linguistically related candidates appear near one another, which will make it easier for the user to judge their validity. In one embodiment, discussed below, the candidate terms are sorted to group together all candidate terms that have the same head word, in other words, the same last noun.

The sorted list of candidate terms is preferably presented to the user on the graphical display monitor 36 during step 370 along with the monolingual reference concordance lines, as discussed further below in conjunction with FIG. 6. In this manner, the user can evaluate each term in the candidate list to identify and remove incorrect candidates from the candidate terminology list, and to identify and add terms that are missing from the candidate list. As discussed further below, a monolingual concordance will present all occurrences of a selected term in context in the source text document 152. As previously indicated, the context provided by the monolingual concordance facilitates the user's determination of whether a candidate term should be added to the final terminology list.

Once the user has evaluated and finalized the terminology list during step 370, program control will proceed to step 380, where execution of the terminology list developer 162 will terminate.

As previously indicated, the terminology list developer 162 will execute the noun phrase extraction subroutine 166 during step 340 to analyze the source text document 152 and extract the multiple word noun phrases. As indicated in FIG. 4, the noun phrase extraction subroutine 166 is entered at step 410. In a preferred embodiment, the noun phrase extraction subroutine 166 will utilize two local variables, start number and stop number, to indicate the upper and lower limit, respectively, of the size of the noun phrases to be extracted. In one embodiment, the noun phrase collector 166 will extract all noun phrases having a size of two to six words.

Thus, the noun phrase collector 166 will identify the values of the variables, start number and stop number, during step 420, and set a counter variable, N, equal to the value of the variable, start number, during step 430. Thereafter, a copy of the source text that has been annotated by the part-of-speech tagger 164 will be searched during step 440 for noun phrases having a length of N, in other words, for noun phrases having a length equal to the current length of the counter variable. In one embodiment, the noun phrase collector 166 will search for a sequence of N nouns or adjectives delimited by words that are not nouns or adjectives. The extracted noun phrases are preferably placed in the list of candidate terms.

Thereafter, the value of the counter variable, N, will be incremented during step 450. A test is performed during step 460 to determine if the current value of the counter variable, N, is greater than the upper limit of the noun phrase size. If it is determined during step 460 that the current value of the counter variable, N, is not greater than the upper limit of the noun phrase size, then program control will return to step 440 and continue in the manner described above. If, however, it is determined during step 460 that the current value of the counter variable, N, is greater than the upper limit of the noun phrase size, then program control will return during step 470 with the candidate terminology list to the calling function, namely, the terminology list developer 162.

As previously indicated, the terminology list developer 162 will execute the candidate term sorting subroutine during step 360 to sort the extracted candidate terms prior to presenting the list to the user. As indicated in FIG. 5, the candidate term sorting subroutine is entered at step 510. In a preferred embodiment, the "better" terms are placed by the candidate term sorting subroutine at the top of the candidate list and linguistically related candidates appear near one another.

In the illustrative embodiment, the candidate terms are grouped by head word, during step 520, so that all terms having the same final noun are grouped together. Within each head word group, the terms are preferably sorted, during step 525, according to their rhyming order. In one embodiment, the candidate terms may be sorted according to their rhyming order by spelling each term backwards, sorting the terms alphabetically, and then returning each term to its original spelling order. Thus, terms having common head words will appear near one another, and within each head word group, head words with common modifiers will appear near one another. For example, candidate terms having the head word "size" would preferably appear in the following order: default paper size, specific paper size, paper size, and size.

In addition, as discussed below, the head word groups are preferably listed by decreasing frequency of the head word in the document. Accordingly, the frequency of the candidate terms in the document 152 is determined during execution of steps 530 through 580.

Thus, the untagged source text document 152 is searched during step 530 to identify an instance of the current candidate term. It is noted that since each candidate term has been extracted from the source text, each candidate term will appear in the source text document at least once. It is further noted that the search is performed in the untagged text without regard to part of speech, as opposed to the tagged text, in order to further overcome errors that may have occurred in the tagging performed by the part-of-speech tagger 164.

A test is preferably performed during step 540 to determine if the byte positions for the currently identified instance of the candidate term falls within the byte positions of a previously processed more specific instance of the current head word. In a preferred embodiment, if a more general candidate term, T1, such as "paper size" is contained in a more specific candidate term, T2, such as "default paper size", then occurrences of the more specific term T2 are preferably not displayed for the more general term T1. In this manner, the occurrences of a more general term, or a head word, are classified into disjoint sets corresponding to more specific terms, leaving only unclassified occurrences under the general term.

If it is determined during step 540 that the byte positions for the currently identified instance of the candidate term falls within the byte positions of a previously processed more specific instance of the current head word, then program control should proceed to step 570, described below, without storing the byte positions or increasing the counter for the currently identified instance of the candidate term.

If, however, it is determined during step 540 that the byte positions for the currently identified instance of the candidate term is not within the byte positions of a previously processed more specific instance of the current head word, then the byte positions for the currently identified instance of the candidate term is preferably stored during step 550 in a monolingual concordance list data record 182 for the current candidate term. In this manner, when the monolingual concordance is presented for the current candidate term, in a manner described below, the currently identified instance of the candidate term will appear in the concordance.

Thereafter, the counter for the current candidate term is incremented during step 560. As previously indicated, the counter information will be utilized during step 590 to sort the head word groups. A test is performed during step 570 to determine if there are additional instances of the current candidate term in the untagged source text document 152. If it is determined during step 570 that there are additional instances of the current candidate term in the untagged source text document 152, program control will return to step 530 and continue in the manner described above.

If, however, it is determined during step 570 that there are no additional instances of the current candidate term in the untagged source text document 152, then a test is performed during step 580 to determine if there are additional candidate terms in the candidate terminology list to be processed.

If it is determined during step 580 that there are additional candidate terms in the candidate terminology list to be processed, program control will return to step 530 and continue in the manner described above. If, however, it is determined during step 580 that there are no additional candidate terms in the candidate terminology list to be processed, program control will proceed to step 590.

The head word groups in the candidate terminology list are preferably sorted by decreasing head word frequency during step 590. In this manner, the "better" terms are placed at the top of the candidate terminology list and the linguistically related candidates appear near one another.

Thereafter, program control will return during step 595 with the sorted candidate terminology list to the calling function, namely, the terminology list developer 162.

In a preferred embodiment, illustrated in FIG. 6, the candidate terminology list generated by the terminology list development tool 160 is presented on the display 36 simultaneously with a monolingual concordance, for evaluation by a user. In one embodiment, illustrated in FIG. 6, the display 36 associated with the terminology list development tool 160 contains a final terminology list viewing window 610, a candidate terminology list viewing window 620 and a concordance window 630. The concordance window 630 displays the monolingual concordance lines for the currently selected candidate term.

In this manner, a user can review the terms in the candidate terminology list appearing in window 620 and determine whether each term should appear in the final terminology list being developed in window 610. In order to facilitate the user's evaluation, the concordance lines for a selected candidate term 640, such as the candidate term "insertion point" selected in FIG. 6, are presented in the concordance window 630. As previously indicated, a monolingual concordance list 182 preferably contains the byte position for each occurrence of each term in the candidate terminology list.

In a preferred embodiment, an add button 670 is included in the candidate terminology list window 620, for adding a selected candidate term to the final terminology list. In an alternate embodiment, where the final terminology list is being developed in the same display window as the candidate terminology list is presented, a delete button 675 (not shown) may be included in the candidate terminology list window 620, for deleting a selected candidate term from the final terminology list. In addition, corresponding key stroke commands can be provided to allow a user to implement these commands from the keyboard 40, in a known manner.

In this manner, a single depression of the proper graphical button 670, 675, or initiation of the corresponding key stroke command, copies a verified candidate term into the appropriate place in the final terminology list, or deletes an improper term from the candidate terminology list. Once a user has evaluated a candidate term, in the manner described above, the terminology list development tool 160 preferably automatically positions the cursor on the next term in the candidate terminology list.

Preferably, the byte position 650 and concordance line 660 for each occurrence of the selected candidate term 640 in the source text document 152 are presented in the concordance window 630. As previously indicated, a monolingual concordance list data record 182, generated by the candidate term sorting subroutine (FIG. 5) during step 550, is associated with each candidate term in the candidate terminology list. Each concordance list data record 182 stores the byte or word position for each occurrence of the term in the source text document 152, as well as a counter indicating the total number of times that the term appears in the document 152.

Accordingly, when the user selects a term from the candidate terminology list, the corresponding concordance list data structure can be accessed to retrieve the byte position associated with each occurrence of the selected term. In this manner, a concordance line 660 having a predefined length can be presented for each occurrence of the selected term in the concordance window 630 centered around the indicated byte position.

In an alternate embodiment (not shown), a fourth window can be provided in the display 36 for providing a full text display of a selected concordance line. Thus, if a user would like more context than the single line provided in the concordance window 630, the user can select a particular concordance line. Thereafter, a full text window, centered around the selected concordance line, can be presented to the user to present the full text of the source text document 152. In a preferred embodiment, when a user selects a particular concordance line in window 630, the full text presented in the fourth window automatically scrolls to the appropriate portion of the source text document 152, in a known manner.

In addition, if a glossary 158 has already been developed for a particular customer or domain, and the present candidate terms are merely potential additions to an existing glossary, then the terms that are already listed in the existing glossary are preferably excluded from the candidate terminology list presented to the user in the candidate terminology window 620.

In order to facilitate scanning of the concordance lines presented in the concordance window 630 for missing candidate terms, all occurrences of the selected candidate term in the concordance lines are preferably sorted such that identical preceding contexts of the selected term are grouped together. For example, for the candidate term "point", all occurrences of the phrase "starting point" are preferably grouped together. In this manner, the noun phrase "starting point" may be identified by the user as a technical term for addition to the final terminology list in the window 610, even though the phrase "starting point" failed to appear in the automatically generated candidate terminology list because the word "starting" is tagged by the part-of-speech tagger 164 as a verb. Preferably, the user can identify a technical term to be added from the concordance region 630 to the final terminology list in the window 610 by graphically "blocking" the desired term, in a known manner, and depressing the add button 670, or alternatively, by entering the desired term using a keyboard command.

GLOSSARY DEVELOPMENT TOOL

As previously indicated, the glossary development tool 170 facilitates the generation of the translation glossary by obtaining candidate translations for terms in the final terminology list generated by the terminology list development tool 160. As discussed below, the glossary developer 172 will search the source text of the aligned text pair 154 for each term in the final terminology list and provide candidate translations based on the indicated alignment with the target language text.

Figure 7:
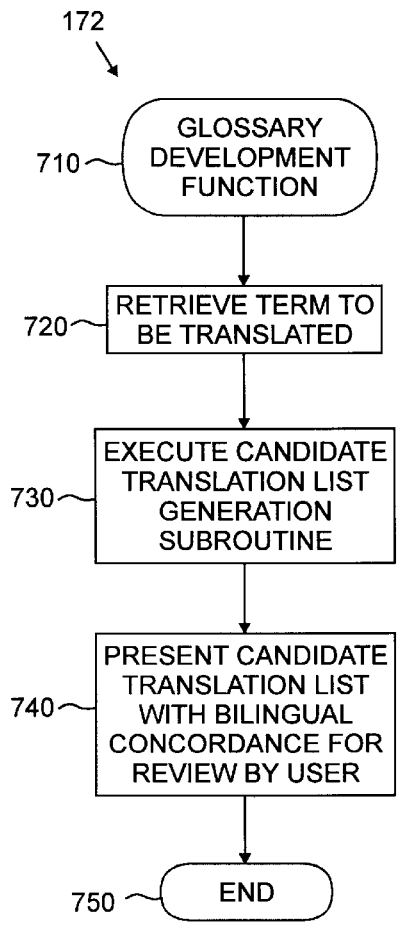
FIG. 7 is a flow diagram describing an exemplary glossary developer for utilization in conjunction with the glossary development tool of FIG. 1B.

The glossary developer 172 embodying principles of the present invention will be entered at step 710, as shown in FIG. 7. The glossary developer 172 will initially retrieve a term to be translated from the final terminology list during step 720. As previously indicated, the glossary developer 172 will propose candidate translations based on the alignment of the selected source text term with a target language document.

Figure 8:
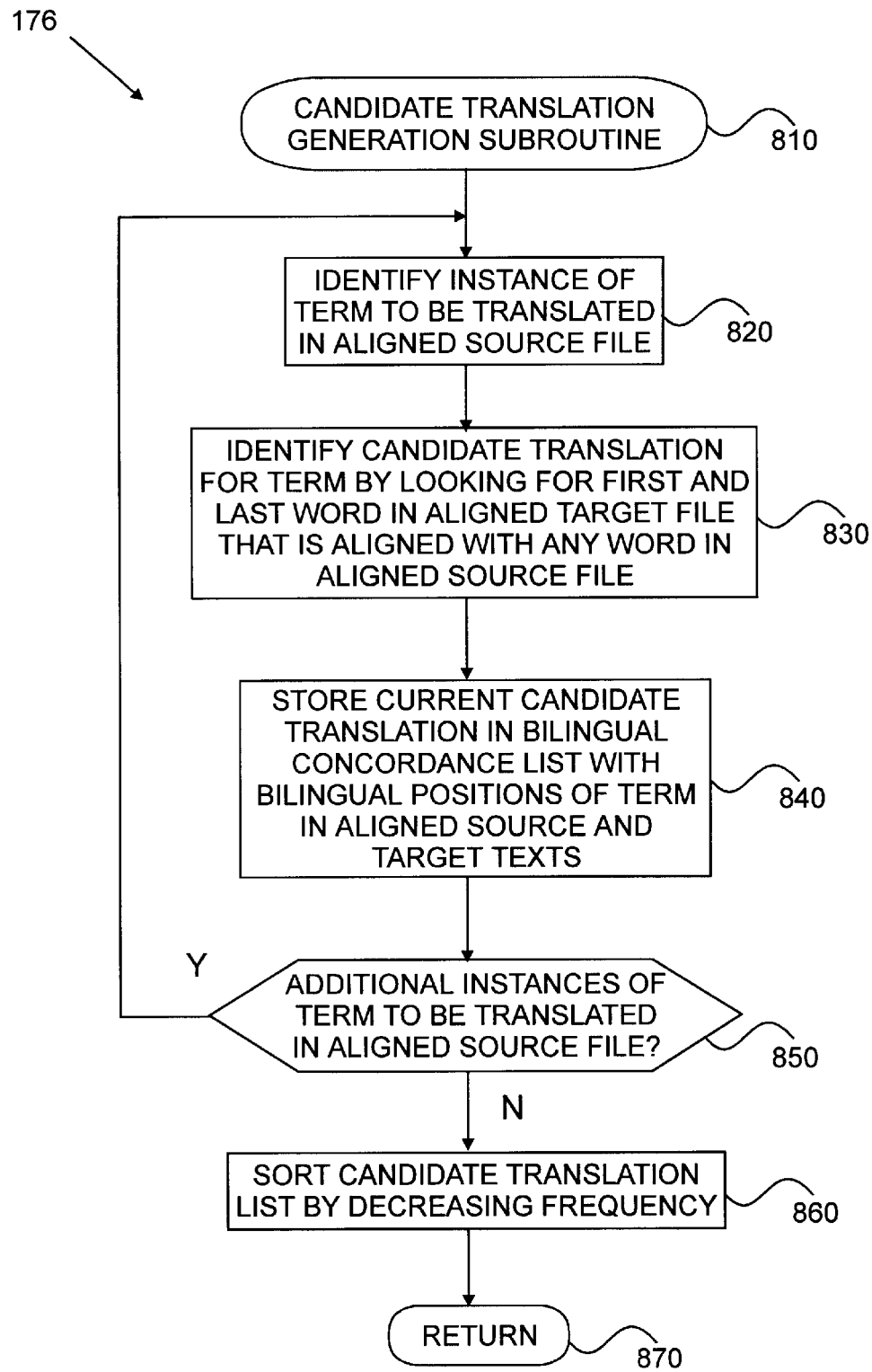
FIG. 8 is a flow diagram describing an exemplary candidate translation gene ion subroutine, suitable for use in conjunction with the glossary developer of FIG. 7.

In a preferred embodiment, a candidate translation list generation subroutine, discussed below in conjunction with FIG. 8, is executed during step 730 in order to obtain the candidate translations for the selected term from the final terminology list.

Thereafter, during step 740, the glossary developer 172 will preferably present the candidate translations to the user on the display 36, along with a bilingual concordance, as discussed further below in conjunction with FIG. 9. In this manner, the user can review and evaluate the presented candidate translations in order to select the appropriate translation to be entered in the translation glossary 158 for the selected source term or to find translations that are missing from the candidate translation list. As discussed further below, a bilingual concordance will present all occurrences of the selected candidate translation in context in the source text document of the aligned text pair, and show the corresponding position of the translated term in the target text document of the aligned text pair 154.

Once the user has evaluated and selected one of the candidate translations, program control will proceed to step 750 where execution of the glossary developer 172 will terminate.

As previously indicated, the glossary developer 172 will execute the candidate translation generation subroutine 176 during step 730 to generate candidate translations for a selected term based on alignment with a document in the target language. As indicated in FIG. 8, the candidate translation generation subroutine embodying principles of the present invention is entered at step 810.

The candidate translation generation subroutine 176 will identify all occurrences of the term to be translated in the source text document of the aligned text pair 154 and obtain a candidate translation for each occurrence of the source text term based on the indicated alignment with the target text document of the pair 154. In a preferred embodiment, the candidate translation generation subroutine 176 will obtain each candidate translation by extracting the sequence of words spanning between the first and last words in the target language document of the aligned pair 154 that are aligned with any of the words of the selected source term.

The candidate translation generation subroutine 176 will identify an instance of the source text term to be translated in the previously translated source text document of the aligned text pair 154 during step 820. Thereafter, the candidate translation generation subroutine 176 will identify a candidate translation for the term during step 830 based on the alignment of the currently identified occurrence by extracting the first and last word in the target text document of the aligned text pair 154 that is aligned with any word in the selected source term. For example, as shown in FIG. 2A, the candidate translation of the term "optional parameters box" would be "zone Parameters optionnels" since "zone" and "optionnels" are the first and last words in the target text that are aligned with any of the words of the source language term. It is noted that in this case the candidate translation is correct even though the word "parameters" is aligned incorrectly with the target text.

The extracted candidate translation will be stored during step 840 in a bilingual concordance list 184, consisting of the candidate translation and the corresponding bilingual byte positions of the selected term in the source text document of the aligned text pair 154 and the corresponding position of the candidate translation in the target text document. A test is performed during step 850 to determine if there are additional instances of the selected term to be translated in the source text document of the aligned text pair 154.

If it is determined during step 850 that there are additional instances of the selected term to be translated in the source text document of the aligned text pair 154, then program control will return to step 820 and continue in the manner described above. If, however, it is determined during step 850 that there are no additional instances of the term to be translated in the source text document of the aligned text pair 154, then the candidate translation list will be sorted by decreasing frequency during step 860.

Thereafter, program control will return during step 870 with the sorted candidate translations to the calling function, namely, the glossary developer 172.

In a preferred embodiment, if there are no words from the source term that are aligned with a word in the target text, for a particular instance of the source text term in the source text document of the aligned text pair 154, the glossary developer 172 will preferably generate an indication that there are "no translations available", which will serve as the candidate translation for that instance of the source text term.

In a preferred embodiment, illustrated in FIG. 9, the candidate translations generated by the glossary development tool 170 are presented on the display 36 simultaneously with a bilingual concordance, for evaluation by a user. In one embodiment, illustrated in FIG. 9, the display 36 associated with the glossary development tool 170 contains a glossary window 910, a candidate translation window 920 and a bilingual concordance window 930, which displays the bilingual concordance lines for the currently selected candidate translation.

In this manner, a user can select a term to be translated from the glossary window 910 and review and evaluate the candidate translations appearing in window 920 which are automatically generated by the glossary development tool 170. Thus, the user can select the appropriate translation to be entered in the translation glossary 156 for the selected source term or find translations that are missing from the candidate translation list. In order to facilitate the user's evaluation, the bilingual concordances for a selected candidate translation 940, such as the candidate translation "menu caractères" selected in FIG. 9, are presented in concordance window 930. As previously indicated, the glossary development tool 170 will access the entry in the bilingual concordance list 184 for the selected candidate translation and present all occurrences of the selected source term in context in the source text document of the aligned text pair, and show the corresponding position of the translation in the target text document of the aligned text pair 154.

In a preferred embodiment, an add button 972 is included in the candidate translation window 920, for adding a selected candidate translation to the translation glossary. In addition, a corresponding key stroke command can be provided to allow a user to implement these commands from the keyboard 40, in a known manner. In this manner, a single depression of the proper graphical button 972, or initiation of the corresponding key stroke command, copies a verified candidate translation into the appropriate place in the translation glossary. Once a user has evaluated the candidate translations for a selected source text term, in the manner described above, the glossary development tool 170 preferably automatically positions the cursor on the next term in the final terminology list presented in the glossary window 910.

Preferably, the bilingual byte positions 985 and bilingual concordance lines 990 for each occurrence of the selected candidate translation 980 in both the source text document and target text document of the aligned text pairs 154 are presented in the concordance window 930. As previously indicated, the bilingual concordance list 184 generated by the candidate translation generation subroutine 176 (FIG. 8) during step 840 includes the bilingual byte positions of each instance of the candidate translation in the source and target texts of the aligned text pairs 154.

Accordingly, when the user selects a candidate translation from the list in the candidate translation window 920, the corresponding entry of the bilingual concordance list 184 can be accessed to retrieve the bilingual byte positions associated with each occurrence of the selected candidate translation. In this manner, a bilingual concordance line 990 having a predefined length can be presented in the concordance window 930 for each occurrence of the selected candidate translation, centered around the indicated bilingual byte positions.

In an alternate embodiment (not shown), a fourth window can be provided in the display 36 for providing a full text display in both the source and target languages of a selected concordance line. Thus, if a user would like more context than the single line provided in the concordance window 930, the user can select a particular bilingual concordance line 990. Thereafter, a pair of full text windows, each centered around the selected bilingual concordance line, can be presented to the user to provide the full text of the source text document and target text documents of the aligned text pair 154.

In a preferred embodiment, the pair of full text windows are in a dual scroll mode, such that when a word is selected in one full text window, the text in the second full text window automatically scrolls to the corresponding region in the translated text. In one embodiment, when a word is selected in one of the full text windows, the dual scroll mode may be implemented by searching the alignment data structure 250 (FIG. 2B) for the nearest word in the same text that is aligned with a word in the corresponding translated text, and then highlighting the region of the translated text associated with the indicated alignment.

It is to be understood that the embodiments and variations shown and described herein are illustrative of the principles of this invention and that various modifications may be implemented by those skilled in the art without departing from the scope and spirit of the invention.

In particular, although the above embodiment has been described in a translation environment, the terminology list development tool 160 can be utilized to construct terminology lists in other applications as well, such as technical writing, book indexing, hypertext linking, natural language interfaces, text categorization and indexing in digital libraries and information retrieval. In addition, the glossary development tool 170 can be useful for information retrieval in multilingual text collections, and for verification of translation consistency at the proofreading or editing step of a translation job, after the document has been translated. For example, if the glossary development tool 170 identified the translation of a particular term in the same way for four out of five occurrences, a violation of the consistency requirement can be identified by a unique translation in the fifth occurrence.

We claim:

1. A system for compiling a terminology list from a source document, said system comprising:
    a processor for extracting multiple word noun phrases from said source document;
    a predefined stop list stored in a memory;
    means for extracting single words not appearing on the predefined stop list from said source document; and
    a display for presenting said extracted multiple word noun phrases and said single words in a candidate terminology list to a user for evaluation in order to develop a final terminology list.

2. The system of claim 1, further comprising a part-of-speech tagger for analyzing said source document and identifying the part of speech for each word in said source document.

3. The system of claim 1, wherein said display includes a first window and a second window and wherein said system further comprises:
    means for displaying said candidate terminology list in said first window;
    means for selecting one of said terms in said candidate terminology list; and
    a concordance tool for displaying each occurrence of said selected term in said source document in said second window.

4. The system of claim 3, further comprising means for selecting one of said occurrences of said selected term presented in said second window and wherein said display further includes a third window for displaying the full context of said selected occurrence of said selected term.

5. The system of claim 3, wherein said concordance tool further comprises processing means for sorting each of said occurrences of said selected term such that all occurrences of identical preceding contexts of said selected term are grouped together.

6. The system of claim 3, further including means for adding a selected candidate term to said final terminology list.

7. The system of claim 3, further including means for deleting a selected candidate term from said candidate terminology list.

8. The system of claim 1, further comprising processing means for sorting said candidate terminology list for efficient presentation to said user.

9. The system of claim 8, wherein linguistically related terms in said sorted candidate terminology list appear near one another.

10. A system for automatically compiling a terminology list from a source document, said system comprising:
    a predefined stop list stored in a memory;
    a processor for extracting multiple word noun phrases and single words not appearing on the predefined stop list from said source document; and
    means for compiling said terminology list comprised of said extracted multiple word noun phrases and said single words.

11. The system of claim 10, further comprising a part-of-speech tagger for analyzing said source document and identifying the part of speech for each word in said source document.

12. The system of claim 10, further comprising a display for presenting said terminology list and wherein said display includes a first window and a second window and wherein said system further comprises:
    means for displaying said terminology list in said first window;
    means for selecting one of said terms in said terminology list; and
    a concordance tool for displaying each occurrence of said selected term in said source document in said second window.

13. The system of claim 12, further comprising means for selecting one of said occurrences of said selected term presented in said second window and wherein said display further includes a third window for displaying the full context of said selected occurrence of said selected term.

14. The system of claim 12, wherein said concordance tool further comprises processing means for sorting each of said occurrences of said selected term such that all occurrences of identical preceding contexts of said selected term are grouped together.

15. The system of claim 12, further including means for adding a selected term to said terminology list.

16. The system of claim 12, further including means for deleting a selected term from said terminology list.

17. The system of claim 10, further comprising processing means for sorting said terminology list for efficient presentation to a user.

18. The system of claim 17, wherein linguistically related terms in said sorted terminology list appear near one another.

19. A system for automatically generating one or more candidate translations for a source language term to be translated into a target language, said system comprising:
    a memory storing a previously translated source language document and a target language document which is a translation of said source language document;
    a word level text alignment tool for automatically aligning said pair of previously translated documents; and
    a processor for searching for said term to be translated in said source language document and obtaining a candidate translation based on the indicated alignment of the words of said term to be translated in the source language document with the words of the target language document of the aligned text pair.

20. The system of claim 19, wherein said word level text alignment tool provides a mapping of the words in said source language document with the words of the corresponding translation in the target language document of said aligned text pair.

21. The system of claim 19, wherein said candidate translations are obtained by extracting the sequence of words spanning between the first and last words in said target language document of the aligned pair that are aligned with any words of the selected source term in said source language document.

22. The system of claim 19, further comprising:
    a display;
    means for presenting said candidate translation on said display for evaluation by a user; and
    a bilingual concordance tool for presenting on said display each occurrence of a source term and the corresponding candidate translation in the source language document of the aligned text pair and the target language document of the aligned text pair.

23. The system of claim 22, further including means for adding said term to be translated and a selected candidate translation to a translation glossary.

24. The system of claim 22, further comprising means for selecting a bilingual concordance line and for presenting the full text of said source language document and said translated target language document corresponding to said selected bilingual concordance.

25. The system of claim 24, wherein said presentation of said full text of said source language document and said translated target language document are in a dual scroll mode.

26. A method for compiling a terminology list from a source document, said method comprising the steps of:

extracting multiple word noun phrases from said source document;

storing a predefined stop list in a memory;

extracting single words not appearing on the predefined stop list from said source document; and presenting said extracted multiple word noun phrases and said single words in a candidate terminology list on a display to a user for evaluation in order to develop a final terminology list.

27. The method of claim 26, further comprising the step of identifying the part of speech for each word in said source document.

28. The method of claim 26, wherein said display includes a first window and a second window and wherein said method further comprises the steps of:

displaying said candidate terminology list in said first window;

selecting one of said terms in said candidate terminology list; and displaying each occurrence of said selected term in said source document in said second window.

29. The method of claim 28, wherein said displaying step further comprises the step of sorting each of said occurrences of said selected term such that all occurrences of identical preceding contexts of said selected term are grouped together.

30. The method of claim 28, further including the step of adding a selected candidate term to said final terminology list.

31. The method of claim 28, further including the step of deleting a selected candidate term from said candidate terminology list.

32. The method of claim 26, further comprising the step of sorting said candidate terminology list for efficient presentation to said user.

33. The method of claim 32, wherein linguistically related terms in said sorted candidate terminology list appear near one another.

34. A method for automatically generating one or more candidate translations for a source language term to be translated into a target language, said method comprising the steps of:

storing a previously translated source language document and a target language document which is a translation of said source language document in a memory;

automatically aligning said pair of previously translated documents at the word level; and searching for said term to be translated in said source language document and obtaining a candidate translation based on the indicated alignment of the words of said term to be translated in the source language document with the words of the target language document of the aligned text pair.

35. The method of claim 34, wherein said step of aligning said pair of documents provides a mapping of the words in said source language document with the words of the corresponding translation in the target language document of said aligned text pair.

36. The method of claim 34, wherein said step of obtaining candidate translations comprises the step of extracting the sequence of words spanning between the first and last words in said target language document of the aligned pair that are aligned with any words of the selected source term in said source language document.

37. The method of claim 34, further comprising the steps of:

presenting said candidate translation on a display for evaluation by a user; and presenting on said display each occurrence of a source term and the corresponding candidate translation in the source language document of the aligned text pair and the target language document of the aligned text pair.

38. The method of claim 37, further including the step of adding said term to be translated and a selected candidate translation to a translation glossary.

* * * * *